United States Patent [19]
Vogt

[11] Patent Number: 5,867,092
[45] Date of Patent: Feb. 2, 1999

[54] HALL EFFECT TRANSFER CASE SHIFT MECHANISM POSITION SENSOR

[75] Inventor: Carl Randall Vogt, Raleigh, N.C.

[73] Assignee: Borg-Warner Automotive, Inc., Sterling Heights, Mich.

[21] Appl. No.: 706,151

[22] Filed: Aug. 30, 1996

[51] Int. Cl.[6] .................................................. B60Q 1/00
[52] U.S. Cl. ........................ 340/456; 74/473 R; 74/335; 74/DIG. 7; 200/61.91
[58] Field of Search ..................................... 340/456, 438, 340/453, 480, 482; 74/DIG. 7, 335, 473 R; 200/61.91; 180/233

[56] References Cited

U.S. PATENT DOCUMENTS

| | | | |
|---|---|---|---|
| 4,100,530 | 7/1978 | den Brinker et al. | 340/53 |
| 4,498,359 | 2/1985 | Hars | 74/850 |
| 4,592,249 | 6/1986 | Lehmann et al. | 74/473 R |
| 4,648,290 | 3/1987 | Dunkley et al. | 74/866 |
| 4,664,217 | 5/1987 | Welch et al. | 180/247 |
| 4,882,572 | 11/1989 | Lippmann et al. | 340/456 |
| 4,896,135 | 1/1990 | Deeds et al. | 340/456 |
| 5,021,764 | 6/1991 | Mabee | 340/439 |
| 5,052,245 | 10/1991 | Kigoshi | 74/665 |
| 5,111,180 | 5/1992 | Suzuki | 340/456 |
| 5,325,083 | 6/1994 | Nassar et al. | 340/456 |
| 5,370,015 | 12/1994 | Moscatelli | 74/335 |
| 5,420,565 | 5/1995 | Holbrook | 340/456 |
| 5,625,289 | 4/1997 | Daetz et al. | 324/207.14 |

Primary Examiner—Thomas J. Mullen, Jr.
Assistant Examiner—Ashok Mannava
Attorney, Agent, or Firm—Brinks Hofer Gilson & Lione; Greg Dziegielewski

[57] ABSTRACT

A shift mechanism position sensor for a transfer case or transmission includes a plurality of Hall effect sensors disposed adjacent a ferrous, metallic plate having a plurality of apertures arranged to provide multi-bit binary signals in gray code. The metallic plate is secured to an internal component such as a shift control rod of the transfer case or transmission and translates bi-directionally adjacent the Hall effect sensors. Data coded in numerous distinct three or four bit binary numbers provides high resolution of the position of the shift mechanism, shift fork and associated clutch. Many four wheel drive motor vehicle transfer cases include a gear reduction assembly which provide direct and reduced speed drives. Such gear selection is often achieved by an electronic control system and it is important to provide information regarding the actual physical position of such gear selection mechanism to the control system. The Hall effect sensors and apertured plate are preferably disposed within the transfer case or transmission and provide accurate and well defined information to the control system.

19 Claims, 4 Drawing Sheets

HALL EFFECT TRANSFER CASE SHIFT MECHANISM POSITION SENSOR

BACKGROUND OF THE INVENTION

The invention relates generally to electrical position sensors for mechanical devices and more specifically to a sensor for the gear selecting mechanism of a transfer case which utilizes Hall effect sensors and a coded, apertured plate.

Nearly every motor vehicle manufactured requires an indication of the condition, i.e., current operating state, of the transmission for some purpose. In early vehicles with fully mechanical transmissions, such indication was achieved by the position of the gearshift lever and was visually provided to the driver. With the advent of automatic transmissions and the limited range of movement of the gearshift lever, a dedicated display providing a positive visual indication of a selected gear was provided. Such displays, in their earliest and least complicated form, included an arrow or gun sight attached to the shift lever which traversed a stationary, sequential display of indicia corresponding to the available gears. In their more complicated configurations, a movable series of such indicia were displayed in a fixed viewing window or a movable light selectively illuminated stationary, translucent indicia.

As transmission vehicle control systems became increasingly complicated, collected data regarding the selected transmission gear might be used not only to provide information to the driver but also for use by other vehicle systems. Such devices are illustrated and described in U.S. Pat Nos. 4,100,530, 4,882,572 and 4,896,135. Gear selection detection and indication systems may also be utilized in conjunction with vehicle diagnostics. A system of this type is presented in U.S. Pat. No. 5,021,764.

Such sensing, display and diagnostic systems utilize diverse sensors, controlled devices and readouts. In U.S. Pat. No. 5,111,180, a plurality of electrical contacts which are arranged to partially overlap, provide distinct combinations of signals which indicate distinct transmission positions. U.S. Pat. No. 5,420,565 teaches a system wherein plurality of electrical contacts, in conjunction with a pattern of conductive and non-conductive areas on a sector plate, provide a four-bit binary code which may be utilized to deduce the transmission position. The four-bit binary code is supplied to both a transmission controller and a visual display.

One drawback the foregoing devices have in common is a separation of the position sensor from the actual positioned elements of the transmission or gear box. That is, the sensor typically senses the position of a gearshift lever or component external to the transmission as opposed to the position of the internal mechanical elements themselves. In many instances this separation is of no consequence as there is little opportunity for a disparity to develop between the commanded position and the actual position of the mechanical components.

Other devices, particularly motor vehicle transfer cases, in which a shift may be commanded but the positioning of the internal components of the transfer case may, by design, be delayed until another vehicle condition such as an off throttle condition is achieved or may simply be impossible to achieve until some current operational condition of the vehicle and driveline has changed, however, present challenges. In order to more accurately detect and provide data regarding the actual physical position of the transfer case gear selection components, it is preferable that the detection mechanism sense the actual position thereof and thus be mounted within the transfer case itself. The present invention relates to such a device disposed within a transfer case.

SUMMARY OF THE INVENTION

A shift mechanism position sensor for a motor vehicle transfer case includes a plurality of Hall effect sensors disposed adjacent a ferrous, metallic plate having a plurality of apertures arranged in an array to provide a unique combination of signals, preferably in gray code, corresponding to various positions of the shift fork and associated components. The metallic plate is secured to an internal component such as a shift control rod of the transfer case or transmission and translates bi-directionally past the Hall effect sensors. Data coded in numerous distinct three or four bit binary numbers provides high resolution of the position of the shift mechanism, shift fork and associated clutch.

Many four wheel drive motor vehicle transfer cases include a gear reduction assembly which provide two-wheel, direct (high gear) drive, four-wheel direct drive and four-wheel, reduced speed (low gear) drive. Such gear selection is often achieved by a sophisticated control system and it is necessary to provide information to this system regarding the actual physical position of such gear selection mechanism. The Hall effect sensors and array of apertures provide accurate and well defined information to the control system of such gear selection mechanism.

Alternate embodiments of the invention are also disclosed which utilize a smaller number of sensors and thus exhibit reduced position definition and operation with rotating components rather than linearly translating components.

Thus it is an object of the present invention to provide a plurality of sensors disposed adjacent a plate having a plurality of apertures which cooperatively provide gray code data relating to the position of a shift mechanism.

It is a further object of the present invention to provide a shift mechanism position detector utilizing Hall effect sensors.

It is a still further object of the present invention to provide a transfer case shift mechanism position detector which is disposed substantially fully within the transfer case.

It is a still further object of the present invention to provide a shift mechanism position detector which senses the actual position of a shift control rod rather than the position of an external shift mechanism drive means thereby improving the accuracy of data provided thereby.

It is a still further object of the present invention to provide a shift mechanism position detector having high resolution of both operating positions as well as positions between operating positions.

It is a still further object of the present invention to provide a shift mechanism position detector adaptable to sense both linear and rotary motion of a shift control member.

Further objects and advantages of the present invention will become apparent by reference to the following description of the preferred and alternate embodiments as well as reference the appended drawings wherein like numbers in the several drawing figures refer to the same element, component or feature.

DESCRIPTION OF THE PREFERRED AND ALTERNATE EMBODIMENTS

Figure 1:
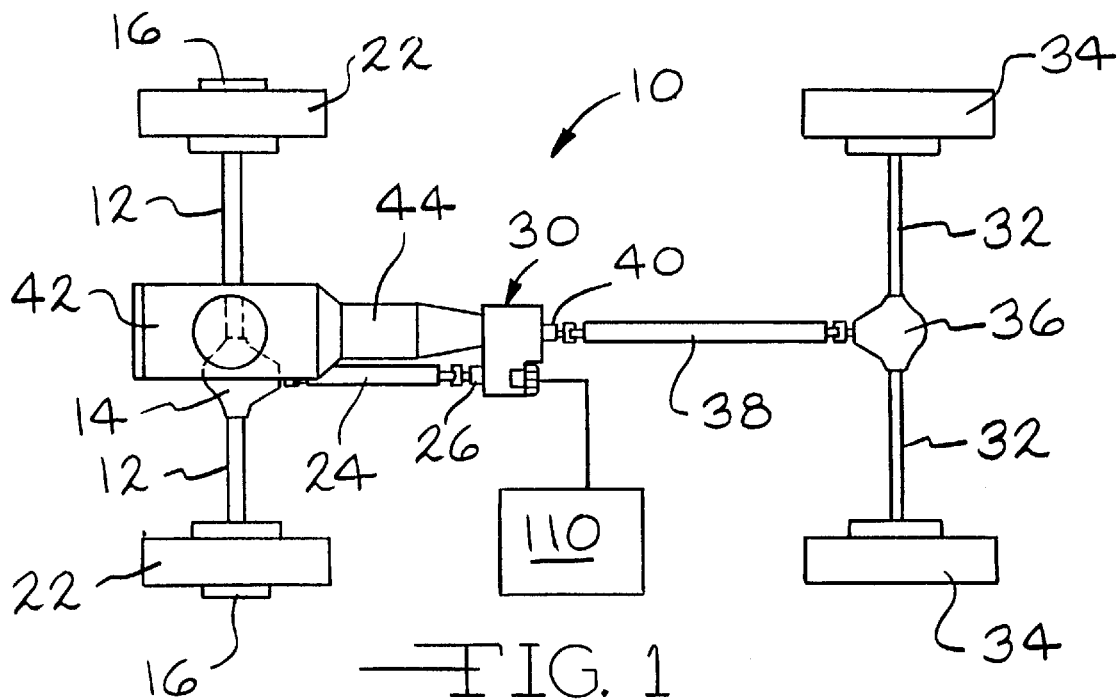
FIG. 1 is a diagrammatic view of a motor vehicle having a drive line and transfer case incorporating the present invention.

Referring now to FIG. 1, a vehicle having a four wheel drive system and a two speed transfer case incorporating the present invention is schematically illustrated and generally designated by the reference numeral 10. The vehicle 10 includes a pair of front (secondary) axles 12 which are centrally coupled to a front (secondary) differential 14. The outer ends of the front (secondary) axles 12 may be connected to a respective pair of locking hubs 16. The locking hubs 16 are preferably vacuum operated and are in fluid communication with a controlled vacuum source (not illustrated). When a vacuum is presented to the hubs 16, they lock and couple the front (secondary) axles 12 to a respective pair of front (secondary) tire and wheel assemblies 22. It will be appreciated that electrically operated locking hubs 16 or mechanically operated locking hubs 16 may be utilized with the present invention. As an alternative, live front (secondary) axles 12 may be utilized with a front (secondary) axle disconnect (not illustrated) disposed in the front (secondary) differential 14. The front differential 14 is driven by a front (secondary) drive or prop shaft 24 which, in turn, is driven by the front (secondary) output shaft 26 of a transfer case 30.

To the rear of the vehicle 10 are disposed a pair of aligned rear (primary) axles 32. The outer ends of the axles 32 are coupled to rear (primary) tire and wheel assemblies 34 and their opposite ends are coupled to and driven by a rear (primary) differential 36. The rear differential 36, in turn, is driven by a rear (primary) drive or prop shaft 38 which is, in turn, driven by a rear (primary) output shaft 40 of the transfer case 30. It will be appreciated that the various aforementioned shafts are coupled by a plurality of universal joints as needed in accordance with conventional vehicle drive train practice. A prime mover, such as an internal combustion engine 42 drives a conventional transmission 44 which may be either a manual transmission with a clutch or an automatic transmission.

The designations "primary" and "secondary" appearing above refer to drivelines in a vehicle 10, primarily and secondarily intended to propel the vehicle 10. Accordingly, in the vehicle 10, the rear drive shaft 38 may, more generically, be referred to or designated the primary drive or prop shaft 38 and this shaft 38 and the associated components, the axles 32, the rear tire and wheel assemblies 34 and the rear differential 36, constitute the primary driveline. Conversely, the front drive shaft 24 is disengaged in two-wheel drive mode and will transfer drive torque in the four-wheel drive mode. Thus, the front drive shaft 24 may, more generically, be referred to or designated the secondary drive or prop shaft 24 and this shaft 24 and the associated components, the front axles 12, the front differential 14, the locking hubs 16, the front tire and wheel assemblies 22 constitute the secondary driveline.

It should be understood that the invention described herein is fully suitable for use with vehicle drive systems conventionally designated front wheel drive where the front drive shaft 24 and associated components will be the primary driveline and the rear drive shaft 38 and associated components will thus be the secondary driveline.

Figure 2:
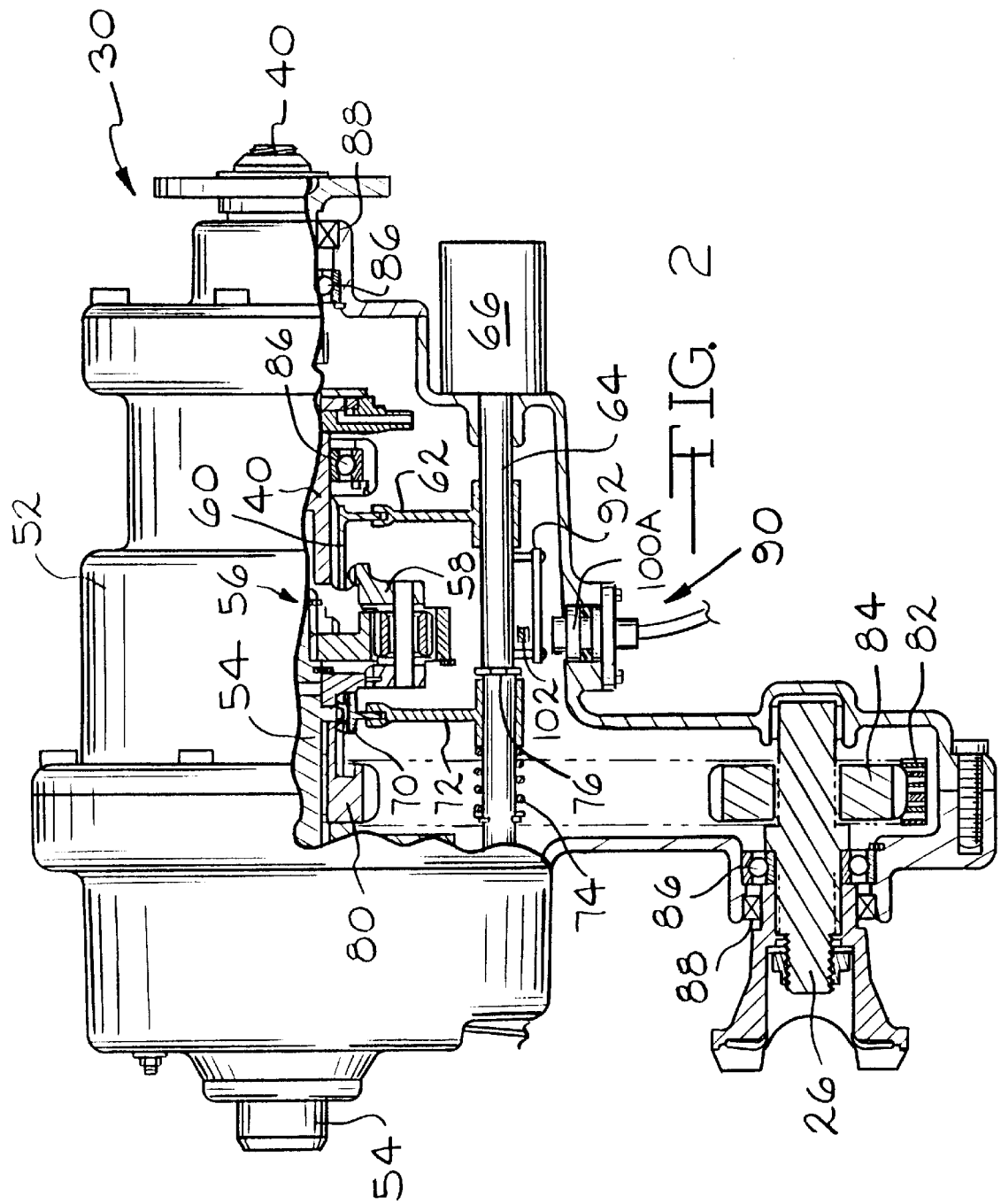
FIG. 2 is a plan view of a transfer case for installation in a typical four-wheel drive motor vehicle with portions broken away.

Referring now to FIG. 2, the transfer case 30 includes a multi-component, preferably cast, housing 52 having suitable apertures, lands, recesses and the like for receiving various components disposed or mounted therein. Specifically, the transfer case 30 includes an input shaft 54 which receives torque from the transmission 44. The input shaft 54 drives a planetary gear assembly 56 which provides a desired speed reduction preferably in the range of 3:1 to 4:1, or higher or lower, to provide low range drive. The planetary gear assembly 56 includes a planet carrier 58 which functions as its output member.

Drive torque is provided to the primary output shaft 40 by a first dog clutch 60 which may be axially bi-directionally translated relative to the primary output shaft 40 to engage either the carrier 58 of the planetary gear assembly 56 in its right most position to provide a reduced speed drive or engaged to the input shaft 54 in its left most position as illustrated in FIG. 2 to provide direct drive to the primary output shaft 40. Bi-directional translation of the first dog clutch 60 is achieved by a first shift fork 62 which is secured to a shift control rod 64. The shift control rod 64 is appropriately bi-directionally translated by a shift control motor 60 which may take the form of a linear, bi-directional actuator such as a ball screw actuator, a rack and pinion mechanism driven by a bi-directional electric motor or a multi-position hydraulic or pneumatic piston and cylinder, for example.

A second dog clutch 70 is also bi-directionally translated by a second shift fork 72 which is resiliently linked to the shift control rod 64. Inasmuch as both the first dog clutch 60 and the second dog clutch 70 may not be able to simultaneously achieve a commanded shift, the second shift fork 72 is resiliently linked to the shift control rod 64 by a compression spring 74. As illustrated, motion of the shift control rod 64 to the left causes positive motion of the second shift fork 72 due to force transmitted directly through a collar or snap ring 76 whereas motion of the shift control rod 64 to the right moves the second shift fork 72 through the resilient, energy storing coupling provided by the compression spring 74.

The second dog clutch 70 selectively couples the carrier 58 of the planetary gear assembly 56 in the right most position of the shift control rod 64 illustrated in FIG. 2 to a chain drive sprocket 80, couples the input shaft 54 to the chain drive sprocket 80 in a center position and allows the chain drive sprocket 80 to free wheel in the left most position of the shift control rod 64. In accordance with conventional transfer case construction, the chain drive sprocket 80 is supported by journal or anti-friction bearings for free rotation on the input shaft 54 and receives and drives a chain 82 to provide drive torque to a driven chain sprocket 84 which positively rotationally drives the secondary output shaft 26 through a set of interengaging splines or is secured thereto by a friction fit or other appropriate coupling. Suitable anti-friction bearings such as the ball bearing assemblies 86 and oil seals 88 are preferably utilized in suitable locations throughout the transfer case 30 in accordance with conventional practice.

Figure 3:
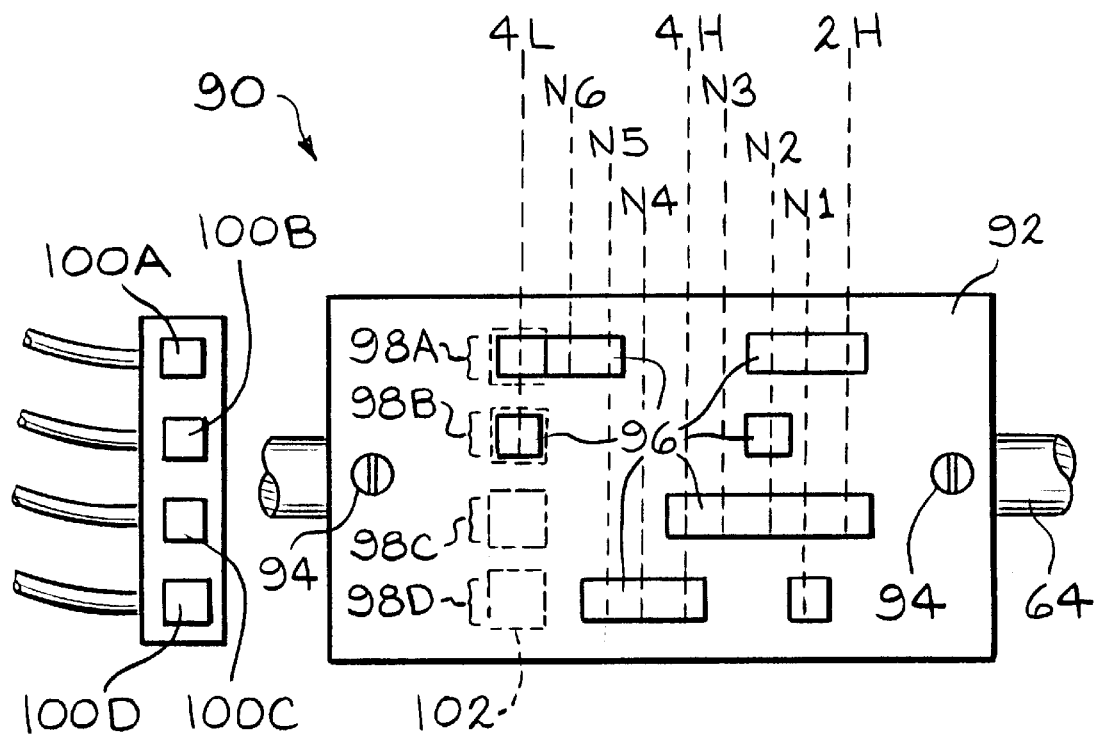
FIG. 3 is a diagrammatic view of a preferred embodiment gray code detection plate and a Hall effect sensor assembly according to the present invention with the sensor assembly folded back to improve clarity.

Referring now to FIGS. 2 and 3, a preferred embodiment Hall effect shift mechanism sensor assembly 90 according to the present invention is illustrated. The Hall effect sensor assembly 90 includes a rectangular, ferrous metal plate 92 secured in spaced relation to the shift control rod 64. The metal plate 92 may be attached by suitable threaded fasteners such as machine screws 94 or other more permanent mounting means such as rivets or weldments. The metal plate 92 includes a plurality of square and rectangular apertures 96 arranged in an array in four parallel tracks 98A, 98B, 98C and 98D and in a unique pattern of specific open and overlapping regions such that incremental longitudinal positions along the metal plate 92 define unique patterns or combinations of openings 96 and undisturbed metal.

Disposed in sensing proximity with each of the four parallel tracks 98A, 98B, 98C and 98D is a Hall effect sensor 100A, 100B, 100C and 100D. Four permanent magnets 102, one associated with each of the Hall effect sensors 100A, 100B, 100C and 100D, are disposed on the opposite side of the metal plate 92 to provide appropriate magnetic flux to enable operation of the Hall effect sensors 100A, 100B, 100C and 100D. As those familiar with such sensors will appreciate, the Hall effect sensors 100A, 100B, 100C and 100D are capable of detecting or sensing the absence (or presence) of adjacent metal and providing a corresponding high or low signal, i.e., binary or two state, output to a device such as a controller 110 illustrated in FIG. 1. Moreover, such Hall effect sensors 100A, 100B, 100C and 100D provide a relatively abrupt or clean transition between the two sensed states such that conditioning of their output signals to provide useable data is minimal and furthermore, that ambiguities in such data during a change of state, even with relatively slow moving sensed components, are short-lived.

The left to right motion of the metal plate 92 relative to the plurality of Hall effect sensors 100A, 100B, 100C and 100D provides a unique four bit binary gray code for nine different positions along the bi-directional traverse of the shift control rod 64. When the shift control rod 64 is in the extreme right position illustrated in FIG. 2, the transfer case 30 is in four-wheel drive low gear. As the shift control rod 64 moves to the left, three distinct intermediate or null positions N6, N5 and N4 are separately detected in order that associated circuitry in the controller 110 may detect not only the current position of the shift control rod 64 and thus the shift forks 62 and 72 and the respective dog clutches 60 and 70 but also the direction of such movement. When the shift control rod 64 is in the middle position, the sensors 100C and 100D provide output logic high signals indicating that the components of the transfer case 30 are in four-wheel drive high mode. Further leftward movement of the shift control rod 64 moves the shift forks 62 and 72 and respective dog clutches 60 and 70 through three additional distinct intermediate or null positions N3, N2 and N1. The right most limit of travel of the shift control rod 64 provides high logic signals from the Hall effect sensors 100A and 100C and indicates that the transfer case 30 is in two-wheel drive, high gear such that the first dog clutch 60 is coupled to the input shaft 54 and the second dog clutch 70 is disconnected and inactive with regard to any drive or torque transfer activity.

A complete truth table for the four bit binary gray code provided by the four Hall effect sensors 100A, 100B, 100C and 100D of the preferred embodiment shift mechanism sensor assembly 90 appears immediately below.

TABLE I

| Position | Sensors | | | |
|---|---|---|---|---|
| | 100A | 100B | 100C | 100D |
| 2H | 1 | 0 | 1 | 0 |
| N1 | 1 | 0 | 1 | 1 |
| N2 | 1 | 1 | 1 | 0 |
| N3 | 0 | 0 | 1 | 0 |
| 4H | 0 | 0 | 1 | 1 |
| N4 | 0 | 0 | 0 | 1 |
| N5 | 1 | 0 | 0 | 1 |
| N6 | 1 | 0 | 0 | 0 |
| 4L | 1 | 1 | 0 | 0 |

Figure 4:
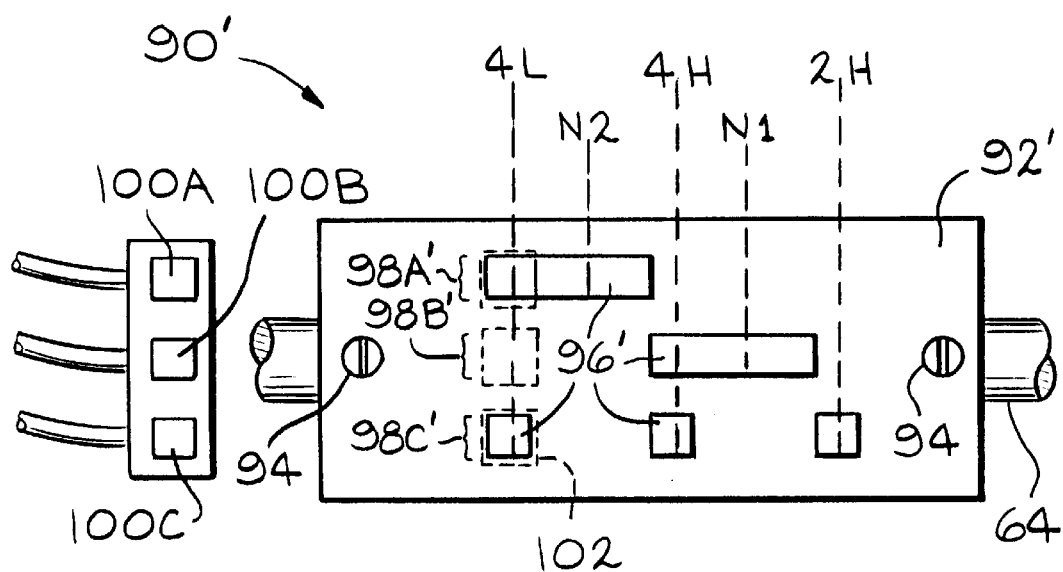
FIG. 4 is a diagrammatic view of a first alternate embodiment gray code detection plate and a Hall effect sensor assembly according to the present invention with the sensor assembly folded back to improve clarity.

Referring now to FIG. 4, a first alternate embodiment 90' of the Hall effect sensor assembly 90 is illustrated. Generally speaking, the first alternate embodiment Hall effect sensor assembly 90' is somewhat less complicated in that it includes three Hall effect sensors 100A, 100B and 100C and thus provides more limited resolution of the position of the first and second dog clutches 60 and 70, the first and second shift forks 62 and 72 and the shift control rod 64. As such, a rectangular ferrous metal plate 92' is secured to the shift control rod 64 by suitable threaded fasteners 94 and includes a plurality of square and rectangular apertures 96' in three defined parallel tracks 98A', 98B' and 98C'. The array of apertures 96' provides three bit binary gray code data from the outputs of the three Hall effect sensors 100A, 100B and 100C as will be readily appreciated. Once again, three suitable permanent magnets 102 are disposed on the opposite side of the metal plate 92' in order to provide appropriate magnetic flux for the operation of the Hall effect sensors 100A, 100B and 100C.

In the first alternate embodiment Hall effect sensor assembly 90', the three defined operating positions of the transfer case, two-wheel drive high, four-wheel drive high and four-wheel low are represented by specific, unique three bit binary or gray code combinations and only a single intermediate or null position, N1 between two-wheel drive high and four-wheel drive high and N2 between four-wheel drive high and four-wheel drive low are provided. A complete truth table for the first alternate embodiment Hall effect sensor assembly 90' appears immediately below.

TABLE II

| Position | Sensors | | |
|---|---|---|---|
| | 100A | 100B | 100C |
| 2H | 0 | 0 | 1 |
| N1 | 0 | 1 | 0 |
| 4H | 0 | 1 | 1 |
| N2 | 1 | 0 | 0 |
| 4L | 1 | 0 | 1 |

Figure 6:
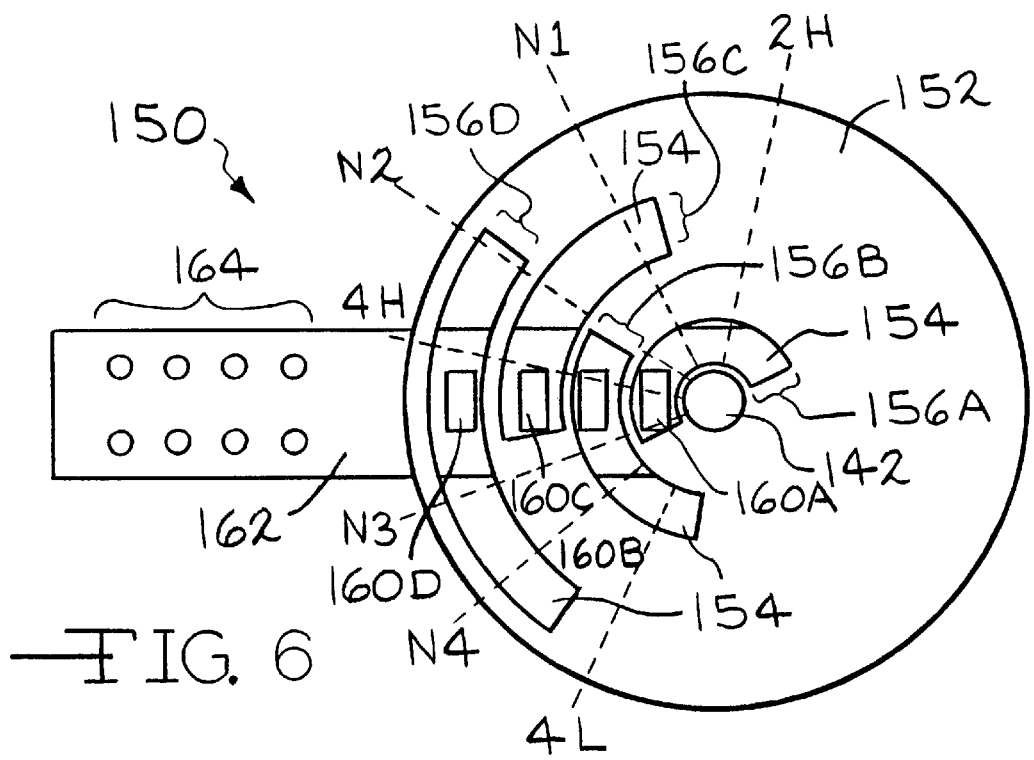
FIG. 6 is a fragmentary, sectional view of a second alternate embodiment gray code detection plate and Hall effect sensor assembly according to the present invention taken along line 6—6 of FIG. 5.
Figure 5:
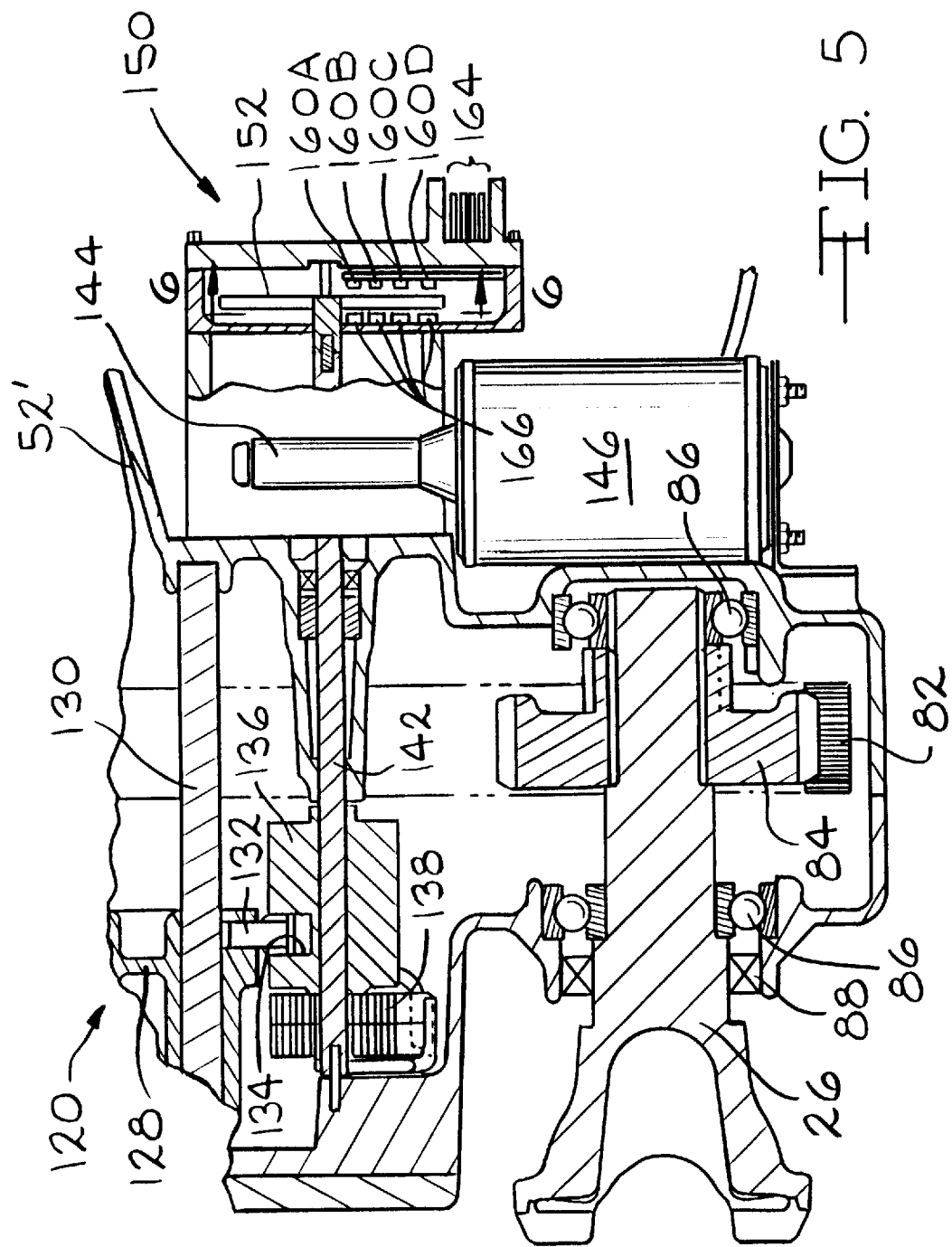
FIG. 5 is a fragmentary, sectional view of a transfer case with an alternate embodiment shift fork drive mechanism and second alternate embodiment gray code detection plate and Hall effect sensor assembly according to the present invention.

Referring now to FIGS. 5 and 6, a second alternate embodiment of the invention is illustrated in conjunction with a transfer case 120. The transfer case 120 is substantially similar to the transfer case 30 illustrated in FIG. 2 with the exception of an assembly 122 which achieves shifting or gear selection within the transfer case and the Hall effect position sensor assembly 124 associated therewith. Specifically, the gear selection assembly 122 includes a shift fork 126 which engages and bi-directionally translates a dog clutch or similar clutch device (not illustrated). The shift fork 128 is received upon a shift rod 130 for sliding, bi-directional translation. The shift rod 130 is received within suitable mounting features of the housing 50'. The shift fork 128 is drivingly engaged by a cam follower 132 which is received within a cam track 134 in a cylindrical cam 136. The cylindrical cam 136 is resiliently driven by a coil drive spring 138 which is, in turn, coupled to a bi-directionally rotating drive shaft 142. The coil spring 138 stores energy and absorbs differences of position of the shift fork and shift control rod 142 when a shift that has been commanded cannot be achieved due to speed differences, lack of synchronization of the gears and the like. The shift control rod 142 is likewise suitably supported within the housing 50' and is driven through a worm gear drive 144 or similar connection by a bi-directionally rotating electric motor 146. It will be appreciated that the worm gear drive 144 or similar mechanical interconnection reduces the output speed of the electric motor 146 and increases the torque applied to the shift control rod 142.

At the end of the shift control rod 142 adjacent the drive motor 146 is a second alternate embodiment Hall effect shift mechanism position sensor assembly 150. The Hall effect shift mechanism position sensor assembly 150 includes a circular, ferrous metal plate 152 having a plurality of arcuate apertures 154 removed therefrom in four concentric, curved tracks 156A, 156B, 156C and 156D. Aligned with a respective one of the four concentric tracks 156A, 156B, 156C and 156D on one side of the circular metal plate 152 are a like plurality of Hall effect sensors 160A, 160B, 160C and 160D. Adjacent the opposite face of the circular metal plate 152 and arranged in alignment with the four Hall effect sensors 160A, 160B, 160C and 160D are a corresponding plurality of permanent magnets 166. The Hall effect sensors 160A, 160B, 160C and 160D may be disposed upon a printed circuit board 162 or similar mounting structure which includes electrical interconnections to an array of output terminals 164 which may be readily engaged by a suitable female connector (not illustrated) to provide signals from the Hall effect sensors 160A, 160B, 160C and 160D to appropriate control devices such as the controller 110 illustrated in FIG. 1. A complete truth table for the four Hall effect sensors 160A, 160B, 160C and 160D of the second alternate embodiment position sensor assembly 150 appears immediately below.

TABLE III

| Position | Sensors | | | |
|---|---|---|---|---|
|  | 160A | 160B | 160C | 160D |
| 2H | 1 | 0 | 0 | 0 |
| N1 | 1 | 0 | 1 | 0 |
| N2 | 1 | 0 | 1 | 1 |
| 4H | 1 | 1 | 1 | 1 |
| N3 | 1 | 1 | 0 | 1 |
| N4 | 0 | 1 | 0 | 1 |
| 4L | 0 | 1 | 0 | 0 |

Once again, it will be appreciated that given the pattern of apertures 154 in the circular metal plate 152, a unique combination of four bit binary gray coded logic is provided by the Hall effect sensors 160A, 160B, 160C and 160D at each significant incremental position of rotation of the circular metal plate 162 thereby providing the controller 110 with specific information regarding the current position of the shift control rod 142 and thus of the shift fork 128 and associated dog clutch. In the second alternate embodiment sensor assembly 150, the use of four Hall effect sensors 160A, 160B, 160C and 160D again results in high definition like that achieved with the four Hall effect sensors 100A, 100B, 100C and 100D of the preferred embodiment.

Accordingly, with either the flat, rectangular sensing plates 92 and 92' of the preferred and first alternate embodiments or the circular metal plate 152 of the second alternate embodiment, the present invention provides exceptional definition of the position of shift members within a transfer case and further, because the sensors are intimately associated with the shifting device, the invention reduces sensing errors which can occur when sensing is done by devices more external to the transfer case or transmission. Finally, it should be noted that the present invention has application in vehicle transmissions and related components as well as in transfer cases.

The foregoing disclosure is the best mode devised by the inventor for practicing this invention. It is apparent, however, that devices incorporating modifications and variations will be obvious to one skilled in the art of gear shift position sensing. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A transfer case having a shift mechanism position sensor comprising, in combination, an input member and a pair of output members, at least one clutch member operably associated with said input member and moveable between a first and a second position, a bi-directional driver for moving said clutch member between said first and said second positions, a structure for linking said driver and said clutch member, a planar member having a plurality of apertures and secured to said structure for movement therewith, and a plurality of Hall effect sensors disposed adjacent one side of said planar member for providing distinct combinations of binary signals corresponding to distinct positions of said plate and said structure.

2. The transfer case shift mechanism position sensor of claim 1 further including a plurality of permanent magnets disposed adjacent an other side of said planar member.

3. The transfer case shift mechanism position sensor of claim 1 wherein planar member and said plurality of sensors provide at least two distinct codes for null positions disposed between said first and said second positions of said clutch member.

4. The transfer case shift mechanism position sensor of claim 1 wherein clutch member is moveable between first, second and third positions and said combination of said planar member and said sensors provides distinct binary signals for each of said three positions.

5. The transfer case shift mechanism position sensor of claim 4 wherein said combination further provides at least two distinct null position indications between said first and said second positions and said second and said third positions.

6. The transfer case shift mechanism position sensor of claim 1 wherein said planar member is a rectangular plate and translates linearly and bi-directionally.

7. The transfer case shift mechanism position sensor of claim 1 wherein said planar member is a circular plate and rotates bi-directionally.

8. A transfer case having a shift mechanism position sensor, comprising, in combination, an input member, a first output member and a second output member, at least one clutch member moveable between a first and a second position, a bi-directional driver for moving said clutch member between said first and said second positions, a structure for linking said driver and said clutch member, a planar member having a plurality of apertures and secured to said structure for movement therewith, and a plurality of Hall effect sensors disposed adjacent one side of said planar member for providing distinct combinations of binary signals corresponding to distinct positions of said plate and said structure.

9. The shift mechanism position sensor of claim 8 wherein said planar member is rectangular and translates linearly and bi-directionally.

10. The shift mechanism position sensor of claim 8 wherein said planar member is circular and rotates bi-directionally.

11. The shift mechanism position sensor of claim 8 wherein said Hall effect sensors provide at least three distinct combinations of signals.

12. The transfer case shift mechanism position sensor of claim 8 wherein clutch member is moveable between first, second and third positions and said combination of said planar member and said sensors provides distinct binary signals for each of said three positions.

13. The transfer case shift mechanism position sensor of claim 8 further including a housing and wherein said planar member and said plurality of sensors are disposed within said housing.

14. A transfer case having a shift mechanism position sensor comprising, in combination, an input member, a first output member and a second output member, at least one clutch member operably associated with said input member and moveable between a first position and a second position, a bi-directional driver for moving said clutch member between said first and said second positions, a ferrous plate having an array of apertures disposed for movement with said clutch member, and a plurality of Hall effect sensors disposed adjacent one side of said ferrous plate for providing at least distinct combinations of binary signals corresponding to three distinct positions of said plate relative to said Hall effect sensors.

15. The transfer case shift mechanism position sensor of claim 14 further including a second clutch moveable by said bi-directional drive and wherein said Hall effect sensors provide at least five distinct combinations of signals.

16. The transfer case shift mechanism position sensor of claim 14 including four of said Hall effect sensors.

17. The transfer case shift mechanism position sensor of claim 14 wherein said plate is rectangular and said plate translates linearly and bi-directionally.

18. The transfer case shift mechanism position sensor of claim 14 wherein said plate is circular and rotates bi-directionally.

19. The transfer case shift mechanism position sensor of claim 14 further including a housing and wherein said plate and said plurality of Hall effect sensors are disposed within said transfer case.

* * * * *